J. Jenkins,

Glass Mold.

N° 30,066.    Patented Sep. 18, 1860.

Witnesses.
R. H. Eady
H. P. Half

Inventor.
Joshua Jenkins

UNITED STATES PATENT OFFICE.

JOSHUA JENKINS, OF BOSTON, MASSACHUSETTS.

MOLD FOR GLASS LAMPS.

Specification of Letters Patent No. 30,066, dated September 18, 1860.

*To all whom it may concern:*

Be it known that I, JOSHUA JENKINS, of Boston, in the county of Suffolk and State of Massachusetts, have invented a new and useful Mold to be Used in Manufacturing Lamps of Glass; and I do hereby declare the same to be fully described in the following specification and illustrated in the accompanying drawings, of which—

Figure 1:
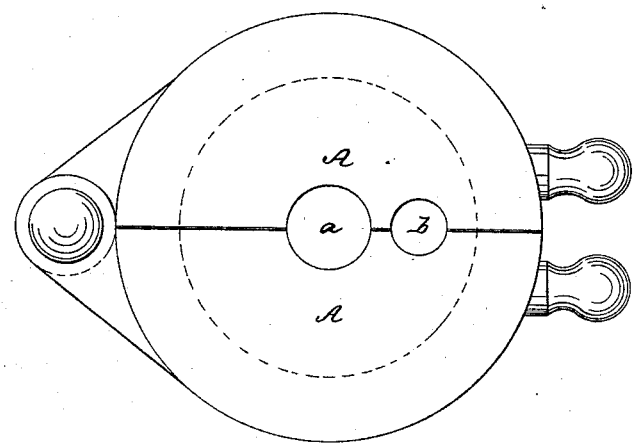
Figure 2:
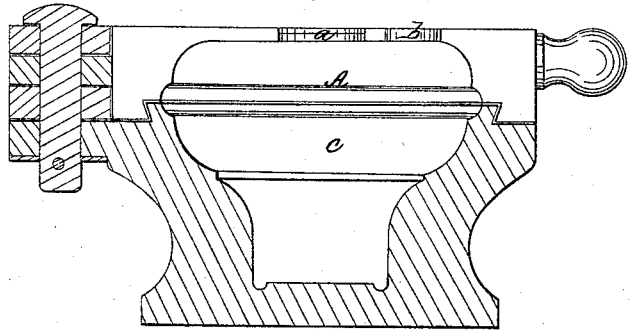

Figure 1, is a top view; and Fig. 2, a vertical section of it.

The nature of my invention consists in a mold provided with a chamber or recess so arranged alongside of the mouth or sprue hole of such mold as to enable a glass blower while blowing a lamp fountain in the mold to raise a concavo convex projection alongside the neck of the article so blown, such projection to be afterward opened or cut away so as to form an auxiliary neck through which the lamp may at any time be supplied with combustible fluid without the necessity of removing the wick tube cap from its neck.

A glass lamp fountain provided with two necks (one to receive the wick tubes and the other to be employed as a passage for the flowage of oil into the body of the fountain) and made by the process of blowing the glass in a mold, may be considered a novelty as an article of manufacture. With my improved mold it can be produced with the exception that the auxiliary neck is not an open one the opening of it having to be subsequently performed by either cutting or breaking away the upper part of the auxiliary neck projection. Thus, by the process of blowing the article in the mold and afterward cutting or breaking away the cap of the auxiliary neck projection, a glass lamp fountain provided with an auxiliary neck can be made.

In the drawings, the mold is shown as made in two principal parts A, A, hinged together and provided with a common sprue hole or neck $a$, the glass, while in the mold and such mold is closed being made to project through the sprue-hole and to connect with the blowing tube.

Figure 3:
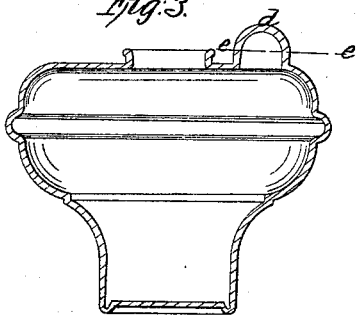

Alongside of the neck, $a$, and either partially in both parts, A, A, or wholly in one of them, I form a cylindrical or slightly conical chamber, $b$, leading out of the main matrix or chamber, $c$, of the mold. While the glass is being blown into and so as to fill the mold, such glass, by the pressure of the air, will be forced into the chamber $b$, and so as to form therein, a concavo convex projection such as shown in section at $d$, in Fig. 3, which exhibits a vertical section of the glass fountain, as it appears when made in the mold. By subsequently breaking or otherwise removing or cutting off in the plane of the line $e$, $e$, the projection $d$, it will be converted into an auxiliary open neck suitable to receive either a stopper or a screw collar and cap.

I claim—

The improved lamp mold as constructed with the auxiliary neck chamber $b$, combined with the main matrix and arranged with respect to the mouth or sprue hole $a$, substantially as described.

JOSHUA JENKINS.

Witnesses:
 R. H. EDDY,
 F. P. HALE, Jr.